(12) United States Patent
Kim et al.

(10) Patent No.: US 8,838,191 B2
(45) Date of Patent: Sep. 16, 2014

(54) PORTABLE COMMUNICATION DEVICE AND SLIDING AND ROTATING HINGE APPARATUS THEREOF

(75) Inventors: Jong-Hae Kim, Gyeonggi-do (KR); Chung-Keun Yoo, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 195 days.

(21) Appl. No.: 13/336,125

(22) Filed: Dec. 23, 2011

(65) Prior Publication Data

US 2012/0165082 A1     Jun. 28, 2012

(30) Foreign Application Priority Data

Dec. 28, 2010    (KR) ........................ 10-2010-0137085

(51) Int. Cl.
*H04M 1/00* (2006.01)
*H04M 1/02* (2006.01)
*G06F 1/16* (2006.01)

(52) U.S. Cl.
CPC ........... *H04M 1/0216* (2013.01); *G06F 1/1681* (2013.01); *H04M 1/0227* (2013.01)
USPC ...................................... 455/575.3; 455/575.4

(58) Field of Classification Search
USPC .......... 455/550.1, 552.1, 553.1, 556.1, 556.2, 455/557, 575.1–575.9, 90.3, 344–350; 345/169
See application file for complete search history.

(56) References Cited

U.S. PATENT DOCUMENTS

| | | | |
|---|---|---|---|
| 2003/0040288 A1* | 2/2003 | Kang et al. | 455/90 |
| 2010/0075726 A1* | 3/2010 | Han et al. | 455/575.3 |
| 2010/0139043 A1* | 6/2010 | Lin | 16/319 |

\* cited by examiner

*Primary Examiner* — San Htun
(74) *Attorney, Agent, or Firm* — Cha & Reiter, LLC

(57) ABSTRACT

A portable communication device and a sliding and rotating hinge apparatus are provided. The device includes a first housing; a second housing, facing the first housing when the device is in a folded state; and a hinge unit. The hinge unit has a first portion attached to the second housing and is configured to slide, together with the second housing, with respect to the first housing to reach a disengaged position. A second portion of the hinge unit automatically rotates once the disengaged position is reached, thereby automatically rotating the second housing around a hinge axis of the hinge unit to open the device to an unfolded state.

16 Claims, 14 Drawing Sheets

PORTABLE COMMUNICATION DEVICE AND SLIDING AND ROTATING HINGE APPARATUS THEREOF

CLAIM OF PRIORITY

This application claims priority under 35 U.S.C. §119(a) to a Korean Patent Application filed in the Korean Intellectual Property Office on Dec. 28, 2010 and assigned Serial No. 10-2010-0137085, the contents of which are incorporated herein by reference.

BACKGROUND OF THE INVENTION

1. Field of the Invention

The present invention relates generally to folder type and flip type portable communication devices. The invention also relates to a hinge apparatus for use with small folding devices such as a portable communication device.

2. Description of the Related Art

The term "portable communication device" typically refers to a small hand-held device that enables a user to wirelessly communicate with another party while carrying the device. Portable communication devices include a Hand-Held Phone (HHP), a CT-2 cellular phone, a digital phone, a Personal Communication Service (PCS) phone, a Personal Digital Assistant (PDA), etc. and are classified into various types depending on their appearance and mechanical operations. For example, wireless terminals are classified into a bar type, a flip type, a folder type, and a sliding type. Each of these conventional portable communication devices includes an antenna, a data Input/Output (I/O) unit, and a data transmission/reception unit. The data I/O unit is usually a keypad (with actual or virtual keys) through which data can be entered by finger pressing.

In a conventional folder-type portable communication device, a folder is engaged with a body in such a manner that the folder may be opened from the body at a predetermined angle by a hinge device. A variety of keys and a microphone are provided at the body and a display and a speaker are provided at the folder. A center hinge arm is installed to the body.

A pair of side hinge arms is installed in engagement with the center hinge arm under the folder in order to rotatably engage the folder with the body. The hinge device is installed to the center hinge arm.

A dual folder with displays on both the inside and outside has recently been developed.

However, the conventional folder-type portable communication device has a small display on its exterior and a large display on its interior and is configured so that a user opens it by opening the folder with one hand by means of the hinge device, while grabbing the body with the other hand. Consequently, the user has difficulty in opening the folder with one hand, which causes user inconvenience.

Accordingly, a need exists to alleviate such inconvenience and enhance the user experience with these types of devices.

SUMMARY OF THE INVENTION

The present invention overcomes the aforementioned problems of the prior art by providing a portable communication device having first and second housings connected with a sliding, rotating hinge mechanism. The second housing is configured to be readily opened via a slide operation of the second housing for a small, predetermined distance with respect to the first housing. The slide results in a disengagement which causes the hinge to automatically rotate and open the second housing with respect to the first, thereby improving the opening operation of the portable communication device. The hinge mechanism thus enables a user to easily open the communication device while holding it in one hand via the application of a small sliding force between the thumb and other fingers, for example.

In an embodiment, a portable communication device includes a first housing; a second housing, facing the first housing when the device is in a folded state; and a hinge unit. The hinge unit has a first portion attached to the second housing and is configured to slide, together with the second housing, with respect to the first housing to reach a disengaged position. A second portion of the hinge unit automatically rotates once the disengaged position is reached, thereby automatically rotating the second housing around a hinge axis of the hinge unit to open the device to an unfolded state.

The sliding of the first portion of the hinge unit can occur in a direction perpendicular to the hinge axis of the hinge unit, causing the second portion of the hinge unit to slide in a direction along the axis of the hinge unit until the disengaged position is reached. The first portion of the hinge unit can comprise a first attachment unit attaching to a first end of the second housing, and a second attachment unit attaching to a second end of the second housing, with the first attachment unit configured to contact an end of the second portion of the hinge unit to cause the second portion to slide when the first attachment unit slides.

BRIEF DESCRIPTION OF THE DRAWINGS

The above features and advantages of certain embodiments of the present invention will be more apparent from the following detailed description taken in conjunction with the accompanying drawings, in which.

Figure 11:
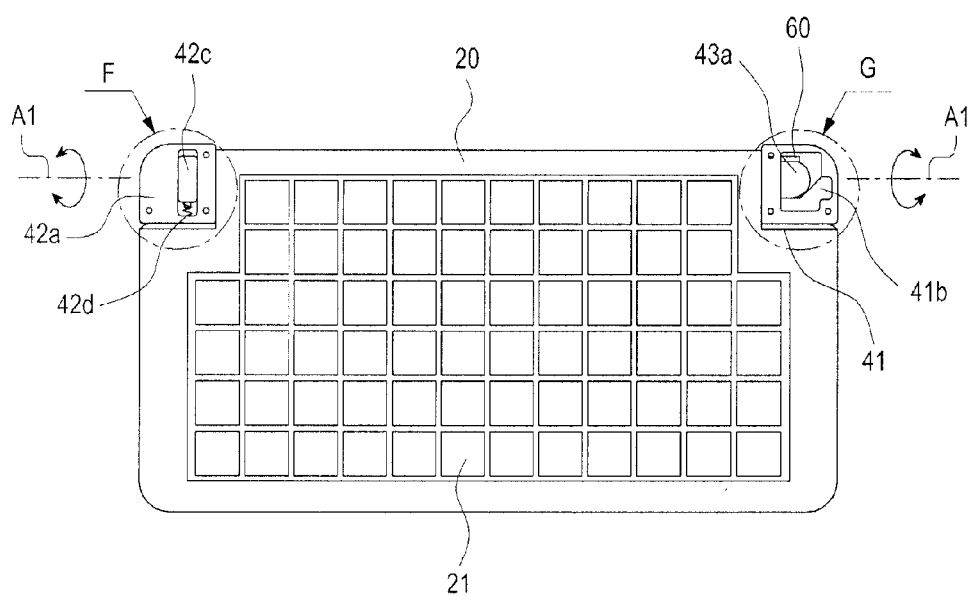
FIG. 11 is a plan view illustrating the bottom housing and portions of the hinge unit inside the bottom housing of FIG. 1 with the portable communication device in the folded state, just after the hinge unit and top housing have slid to a disengaged position but prior to rotation.
Figure 12:
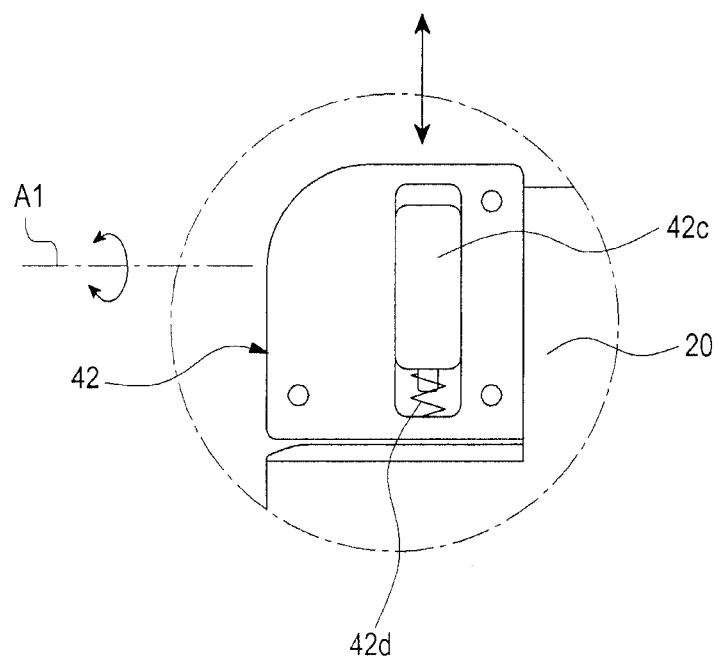
Figure 13:
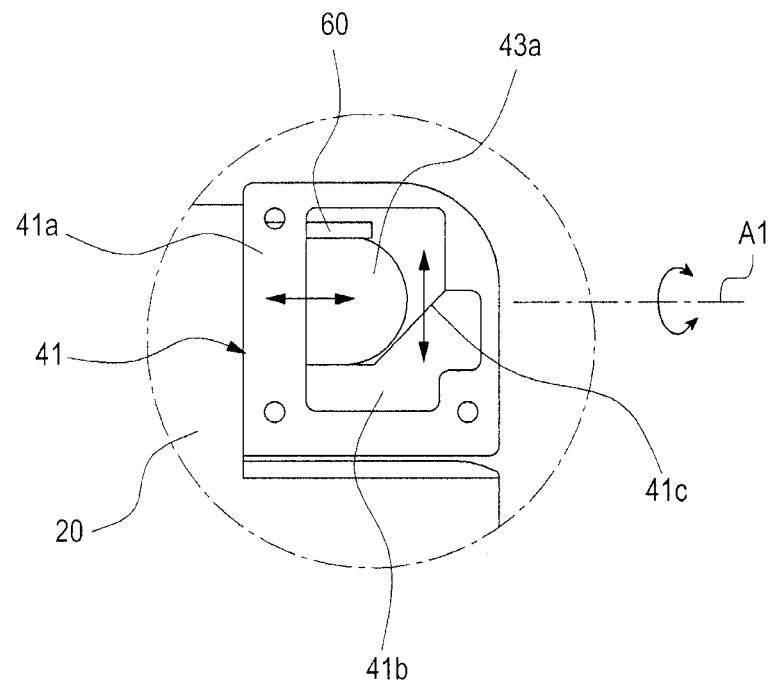
Figure 14:
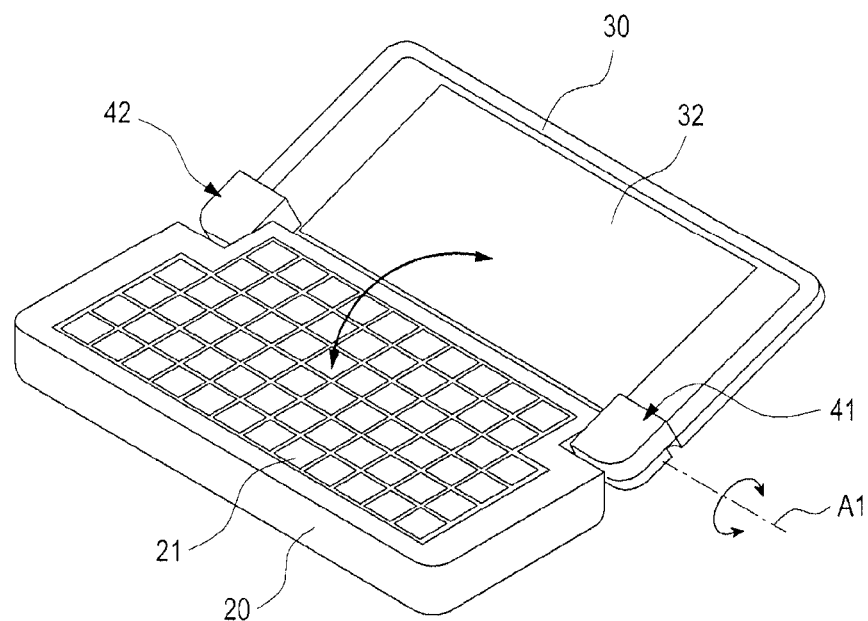
Figure 15:
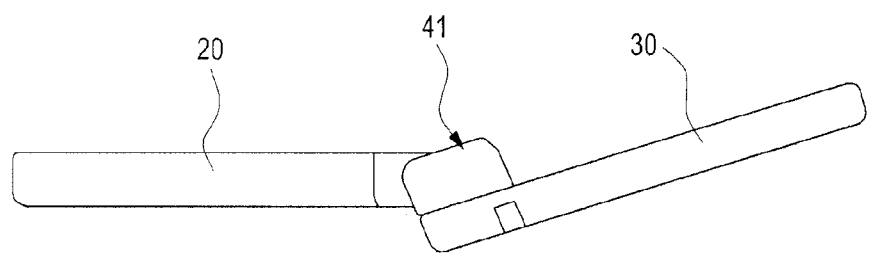
Figure 16:
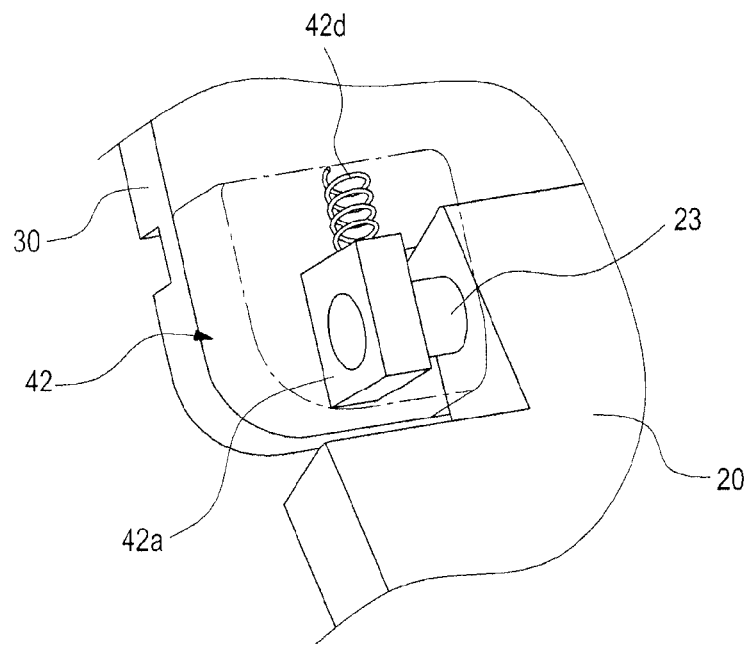
Figure 17:
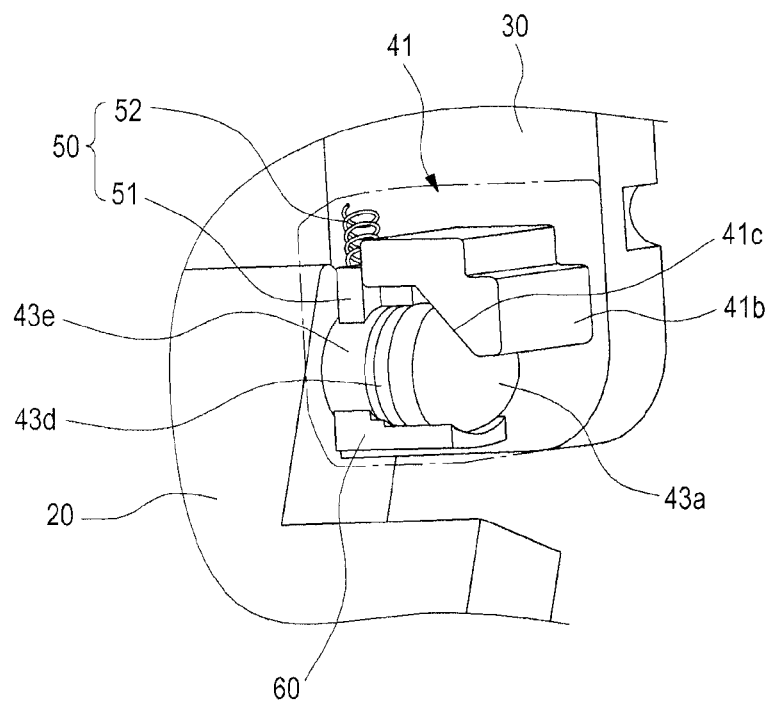
Figure 18:
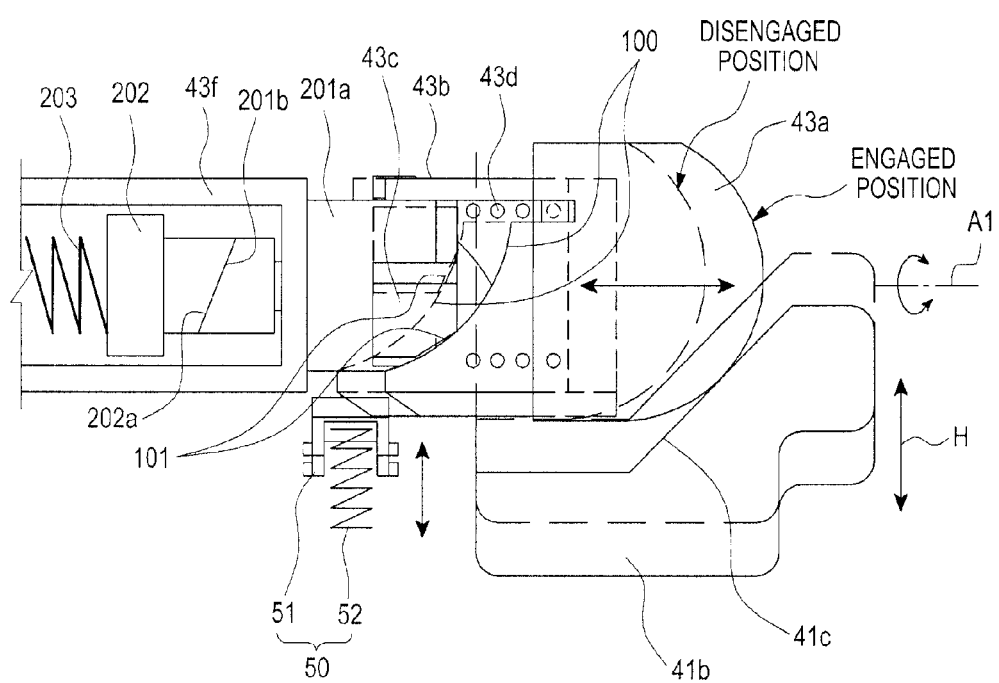
Figure 19:
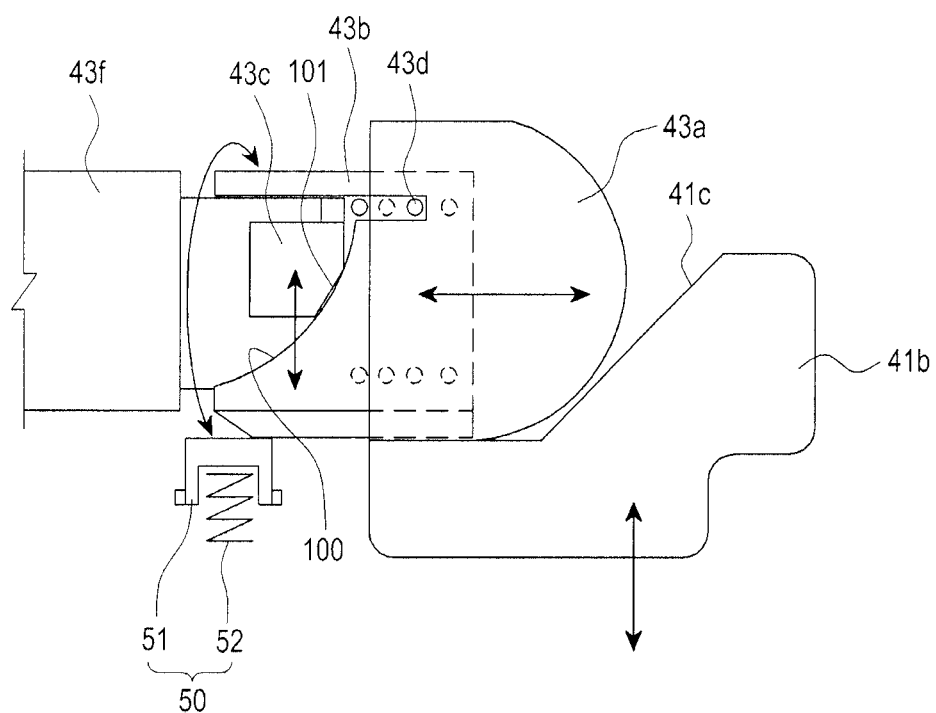

FIG. 12 is an enlarged plan view of a part F illustrated in FIG. 11;

FIG. 13 is an enlarged plan view of a part G illustrated in FIG. 11;

FIG. 14 is a perspective view illustrating an unfolded operation state of the portable communication device and its sliding and rotating hinge apparatus according to an embodiment of the present invention;

FIG. 15 is a side view illustrating an unfolded operation state of the portable communication device and its sliding and rotating hinge apparatus according to an embodiment of the present invention;

FIG. 16 is a perspective view of a second sliding hinge unit in the portable communication device and its sliding and rotating hinge apparatus according to an embodiment of the present invention;

FIG. 17 is a perspective view of a first sliding hinge unit in the portable communication device and its sliding and rotating hinge apparatus according to an embodiment of the present invention;

FIG. 18 is a side sectional view illustrating an operation of the rotating hinge unit in the portable communication device and its sliding and rotating hinge apparatus according to an embodiment of the present invention; and FIG. 19 is a side sectional view illustrating an unfolded, post-operation state of the rotating hinge unit in the portable communication device and its sliding and rotating hinge apparatus according to an embodiment of the present invention.

Throughout the drawings, the same drawing reference numerals will be understood to refer to the same elements, features and structures.

DETAILED DESCRIPTION

Reference will now be made in detail to the preferred embodiments of the present invention with reference to the accompanying drawings. The embodiments of the present invention as set forth herein and the configurations illustrated in the drawings are merely illustrative embodiments of the present invention and it is to be clearly understood that many modifications can be made to the illustrated embodiments without departing from the scope and spirit of the present invention.

Figure 1:
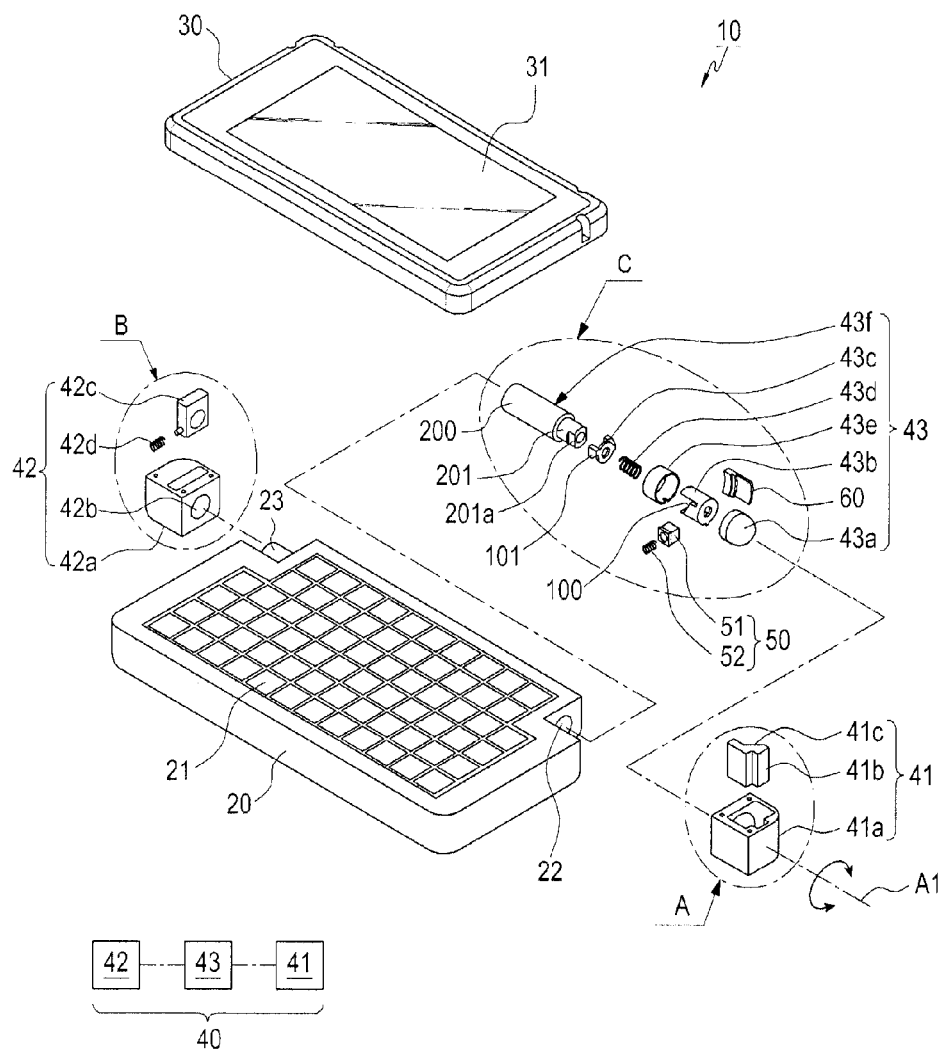
FIG. 1 is an exploded perspective view illustrating the configurations of a portable communication device and its sliding and rotating hinge apparatus according to an embodiment of the present invention.
Figure 2:
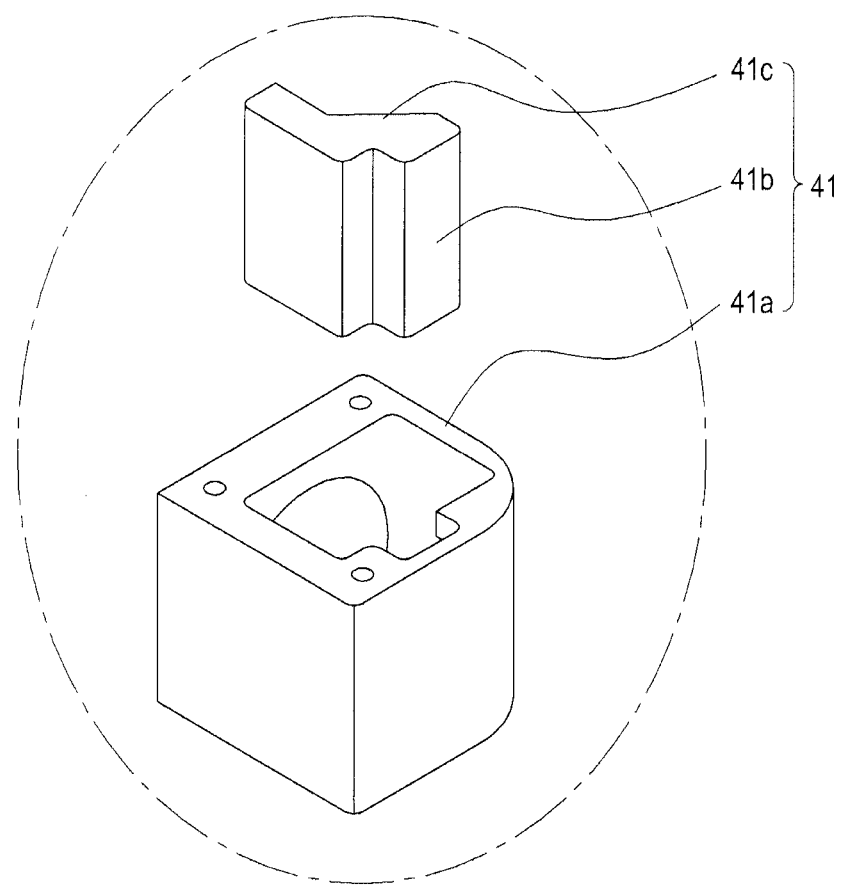
FIG. 2 is an enlarged exploded perspective view of a part A illustrated in FIG. 1.
Figure 3:
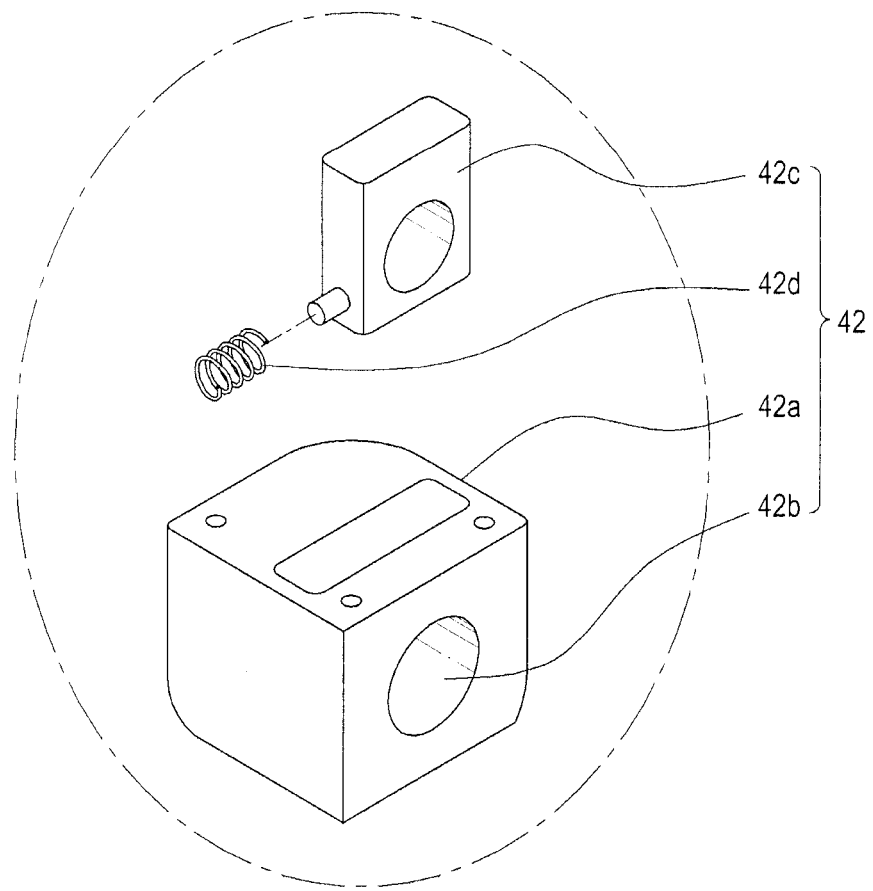
FIG. 3 is an enlarged exploded perspective view of a part B illustrated in FIG. 1.
Figure 4:
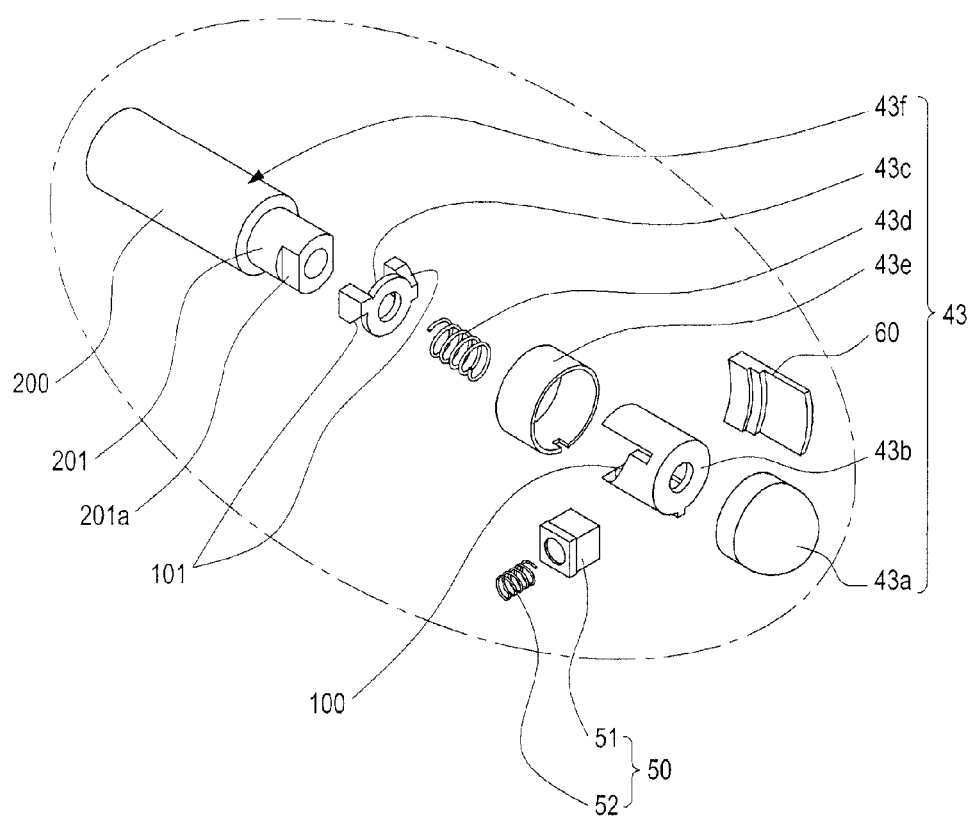
FIG. 4 is an enlarged exploded perspective view of a part C illustrated in FIG. 1.

Referring to FIG. 1, a handheld, portable communication device 10, shown in an exploded view, includes first (bottom) and second (top) housings 20 and 30 and a sliding and rotating hinge unit 40. The device 10 is exemplified as a folder-type personal communication device; however, it is understood that the invention may also be applicable to flip type communication devices. As illustrated, the hinge unit 40 is comprised of first and second sliding hinge units 41 and 42 and a rotating hinge unit 43. The hinge unit 40 rotatably engages and attaches the top and bottom housings 30 and 20 to one another. When the device 10 is in the folded (closed) state, the major surfaces of top and bottom housings 30 and 20 face one another.

In accordance with the invention, with the device 10 in a folded state, a user can readily unfold the device 10 with one hand by first sliding the top housing 30 with respect to bottom housing 20 by a small, predetermined distance, e.g., in the direction perpendicular to the hinge axis A1, such that a disengaged position is reached. That is, in the folded state, the top and bottom housings 30 and 20 are in an engaged (semi-locked) state, which engagement can be broken with a small relative sliding motion. With a small external sliding (translational) force applied by the user, the top housing 30 is shifted with respect to the bottom housing to reach the disengaged position. The small sliding distance may be on the order of e.g., 1 mm. Once shifted to the disengaged position, the hinge unit 40 automatically rotates about axis A1, and since the top housing 30 is attached to the hinge unit 40 on both sides thereof, the top housing 30 automatically rotates to an open (unfolded) position. Exemplary means by which these operations are implemented via the hinge unit 40 will be explained in detail hereafter. The hinge slide and automatic rotation mechanism enables a user to easily open the communication device 10 from a folded to an unfolded state by grasping the same with one hand, using simple thumb motion or the like to slide the top housing relative to the bottom to initiate the automatic hinge rotation.

It is noted here that for the sake of brevity, the legend 10 will also be used to refer to a sliding and rotating hinge apparatus 10, to refer to applications in which the hinge unit 40 is applied to other types of devices besides personal communication devices (or to refer to just hinge unit 40 and the housings 30 and 20 without workable electronics therein). In addition, sliding hinge units 41 and 42 will be interchangeably referred to as first and second attachment units 41 and 42, respectively.

The first housing 20 includes at least one of an Input/Output (I/O) unit 21, a speaker (not shown), a microphone (not shown), a camera module (not shown), and a battery pack (not shown). The I/O unit 21 includes at least one of a display, a touch screen, a keypad, navigation keys, QWERTY keys, and game-dedicated keys.

Referring now to FIGS. 1, 6, 10, 14 and 15, the personal communication device 10 includes a large interior display 32 on the second housing 30 which is viewable upon unfolding the device 10. Device 10 can also include a second large display 31 on the exterior of the second housing 30, a touch screen (not shown), a speaker (not shown), a microphone (not shown), and a camera module (not shown) provided on the exterior or interior of the second housing 30.

Figure 6:
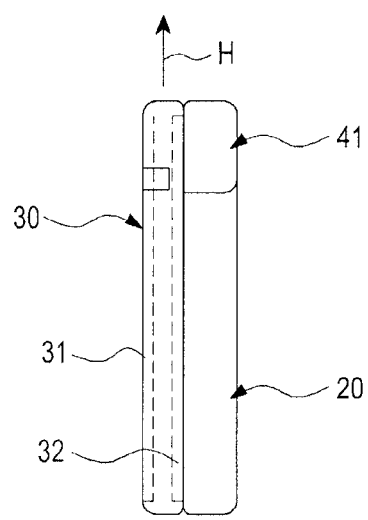
FIG. 6 is a side view illustrating a folded state of the portable communication device and its sliding and rotating hinge apparatus according to an embodiment of the present invention.
Figure 10:
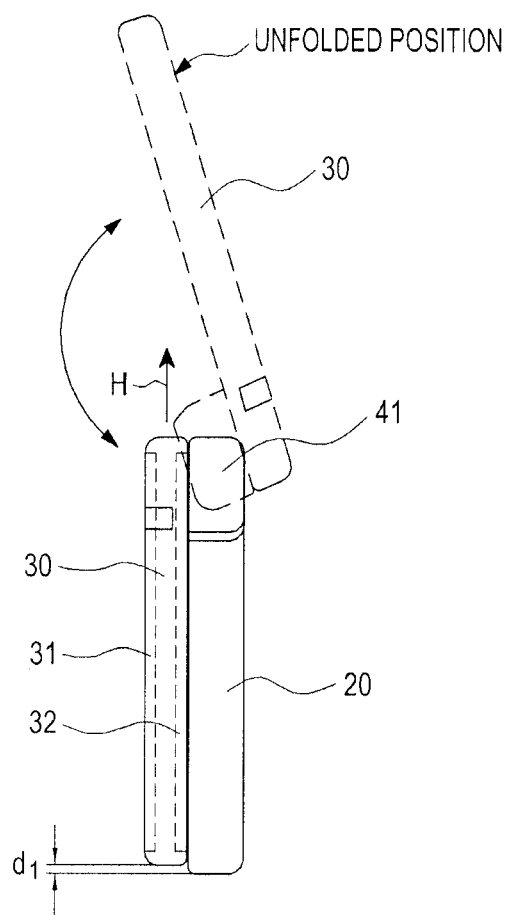
FIG. 10 is a side view illustrating a movement of the portable communication device and its sliding and rotating hinge apparatus from a folded state to an unfolded state according to an embodiment of the present invention.

Referring to FIGS. 1, 6 and 10, when in the folded state the second housing 30 is configured to slide (shift) upon application of a small translational force supplied by the user. In the embodiment shown in FIGS. 6 and 10, the slide occurs in the direction H for a small predetermined distance d1, which can be e.g., about 1 mm from the first housing 20. When in the folded state prior to the shift as shown in FIG. 6, the two housings 20 and 30 are in an engaged or semi-locked position via a suitable engagement means, as will be described later. The small translational force and the shift by the distance d1 causes the second housing 30 to disengage from the first housing 20 and automatically rotate to an unfolded position as seen in FIG. 10. The automatic rotation is caused by an automatic rotation means applying spring force upon hinge 40 as will be described below.

Referring now collectively to FIGS. 1 to 19, the sliding and rotating hinge unit 40 includes first and second sliding hinge units 41 and 42 and a rotating hinge unit 43. The first sliding hinge unit 41 is attached at one end of the second housing 30 via suitable attachment means, for sliding along with the second housing 20 and then automatically rotating with the second housing 20. The second sliding hinge unit 42 is attached at the other end of the second housing 30 via suitable attachment means, for sliding along with the second housing 20 and then supporting the automatic rotation of the second housing 20. The rotating hinge unit 43 is disposed in contact with the first sliding hinge unit 41 so that when the first and second sliding hinge units 41 and 42 slide by the predetermined distance d1, the rotating hinge unit 43 slides in a transverse (e.g. perpendicular) direction by a sufficient distance in the direction of the hinge axis A1 to release the top and bottom housings 20 and 30 (and the first and second sliding hinge units 41 and 42) from an engaged state. Upon disengagement, automatically rotation of the first and second sliding hinge units 41 and 42 occurs.

Referring to FIGS. 1, 2, 7, 9, 11, 13 and 17, the first sliding hinge unit 41 includes a first sliding housing 41a and a first sliding cam 41b. The first sliding housing 41a is provided at one end of the second housing 30, for sliding along with the second housing 30 and accommodating the first sliding cam 41b in contact with a head 43a of the rotating hinge unit 43. The first sliding cam 41b is disposed within the first sliding housing 41a, in contact with the head 43a; sliding cam 41b slides along with the second housing 30 in a direction perpendicular to the hinge axis A1 and also pushes the head 43a in the direction of the hinge axis A1. It is noted here that the term "sliding cam" is used loosely and is not to be construed in the strict definition of a cam, i.e., a device that imparts variable linear motion to a follower. Herein, the term sliding cam is used to refer to any part that is designed to slide and also to rotate.

Referring to FIGS. 13, 18 and 19, a guide inclined surface 41c is formed on the first sliding cam 41b, to move the head 43a when the second housing 30 slides.

Referring to FIGS. 1, 5, 17, 18 and 19, an elastic presser 50 is provided within the first sliding housing 41a, for contacting a mover 43b of the rotating hinge unit 43 and elastically pressing the mover 43b so that the mover 43b may slide. The elastic presser 50 includes a pressing member 51 and a coil spring 52. The pressing member 51 is accommodated in the first sliding housing 41a, for contacting the mover 43b and pressing the mover 43b by elastic force of the coil spring 52 so as to move the mover 43b. As will be explained below, when the personal communication device 10 is folded again by the user after use, the elastic presser 50 serves to press the mover 43b back to its original position prior to the slide operation to unfold the device 10 in the first place. That is, the mover 43b slides back in the opposite direction due to spring action of the elastic presser 50.

Referring to FIGS. 1, 3, 7, 8, 11, 12 and 16, the second sliding hinge unit 42 includes a second sliding housing 42a, a hinge hole 42b, a second sliding cam 42c, and an elastic member 42d. The second sliding housing 42a, which accommodates the second sliding cam 42c and the elastic member 42d, is provided at the other end of the second housing 30 in order to slide along with the second housing 30, when the second housing 30 slides. The hinge hole 42b is formed into the second sliding housing 42a, for allowing a hinge protrusion 23 of the first housing 20 to extend therethrough. Note that the protrusion 23 is protruded at a bottom housing 20 so that a hinge part of a second sliding can rotatably engage.

The second sliding cam 42c is rotatably engaged with the hinge protrusion 23 extended through the hinge hole 42b within the second sliding housing 42a, for supporting movement of the second sliding housing 42a. The elastic member 42d is engaged with the second sliding cam 42c within the second sliding housing 42a, for providing elastic force to the second sliding housing 42a so that the second sliding housing 42a may move.

Referring to FIGS. 1, 4, 5, 18 and 19, the rotating hinge unit 43 includes the head 43a, the mover 43b, an engagement releaser 43c, a hinge elastic member 43d, a support housing 43e, and a hinge module 43f. The head 43a is positioned in the first sliding housing 41a to make contact with the first sliding cam 41b. In FIG. 18, to illustrate operating motion of the various components, the components shown with solid lines represent a position prior to the user initiating a slide operation, i.e., the folded state of the device 10. The dashed lines show the position of the components just after the slide operation. When the first sliding cam 41b slides in the direction perpendicular to the hinge axis A1 (i.e., north-ward in FIG. 18), head 43a slides in the direction of the hinge axis A1 (i.e., left-ward in FIG. 18) in conjunction with the transverse motion of first sliding cam 41b. The mover 43b is engaged with the head 43a to move together with the head 43a. The engagement releaser 43c is provided inside the support housing 43e, facing the mover 43b, to slidingly contact the mover 43b and carry out a guided rotation, when the mover 43b travels. The hinge elastic member 43d is in the mover 43b to provide elastic force so that the head 43a and the mover 43b may move and the movement of the head 43a may in turn move the first sliding cam 41b. (The head 43a moves the first sliding cam 41b back in the right-ward direction after the user folds the device 10 again.) The support housing 43e is combined with the mover 43b to support the guided rotation of the engagement releaser 43c and the movement of the mover 43b as well.

Referring to FIGS. 1, 4, 18 and 19, the hinge module 43f is provided at one side of the support housing 43e. The hinge module 43f includes a hinge shaft 201 engaged with the engagement releaser 43c. Specifically, a hinge protrusion 201a formed at the hinge shaft 201 is engaged with the engagement releaser 43c. When the engagement releaser 43c rotates, the hinge protrusion 201a also rotates. In the embodiment, if a mover 43b moves from right side to left side on the drawings, a guide portion 100 slides along an inclined surface 101 and makes an engagement releaser 43c rotate and a hinge shaft 201 is rotated by rotation of the engagement releaser 43c. If the hinge shaft 201 is rotated, engagement of the engagement releaser 43c is released and a mountain-shaped portion 201b formed on the other end of the hinge shaft 201 is rotated in a valley-shaped portion 202a of a hinge cam 202 by rotation of the hinge shaft 201 and as a result, the mountain-shaped portion 201b is rotated automatically.

Thus, a mountain-shaped portion (201b) of the hinge shaft 201 goes over a corresponding valley-shaped portion (202a) which will be described later, thereby releasing their engagement.

Then the mountain-shaped portion(201b) slidingly rotates over the valley-shaped portion(202a), providing force to the hinge shaft 201 so that the hinge shaft 201 may automatically rotate. Thereby, the first and second sliding housings 41a and 42a and the second housing 30 are automatically rotated.

Referring to FIGS. 1, 4, 18 and 19, the head 43a is shaped into a semi-sphere such that the head 43a may slidingly contact the guide inclined surface 41c of the first sliding cam 41b. An inclined guide portion 100 is formed on the mover 43b, for guiding rotation of the engagement releaser 43c during movement of the mover 43b. As seen in FIGS. 1, 4, 18 and 19, a rotation inclined surface 101 is formed on the engagement releaser 43c, facing the inclined guide portion 100 of the mover 43b.

As shown in FIGS. 1, 4, 18 and 19, the hinge module 43f includes a hinge housing 200, the hinge shaft 201, a hinge cam (202), and an elastic member (203). The hinge cam(202) and elastic member(203) form part of an automatic rotation means 210 that rotates the hinge shaft 201 with elastic action, e.g., spring action, upon disengagement of the hinge unit 40 (i.e., disengagement of the first and second housings 20 and 30 following the predetermined slide movement by distance d1). The hinge shaft 201 operates with a suitable engagement means 220, which for example can be the aforementioned mountain-shaped protrusion(201b) on shaft 201 engaged in a valley-shaped recess(202a) within the housing 20 (within a surface of the housing 20 adjacent the shaft 201). The hinge housing 200 is accommodated in a rotation hole 22 formed into the first housing 20 in order to rotate the first sliding hinge unit 41. The hinge shaft 201 is rotatably accommodated in one end of an accommodation space (not shown) formed in the hinge housing 200. The hinge shaft 201 is provided, at one end thereof, with the hinge protrusion 201a extended through a through hole (not shown) formed into the hinge housing 200 and engaged with the engagement releaser 43c and, at the other end thereof, with the mountain-shaped portion (201b) corresponding to the valley-shaped portion (202a) of the later-described hinge cam (202). The hinge cam(202) has the valley-shaped portion(202a) corresponding to the mountain-shaped portion(201b) at one end thereof. The hinge cam(202) makes a linear reciprocation within the accommodation space. The hinge cam(202) also has the elastic member (203) at the other end thereof, for providing elastic force to bring the hinge cam(202) and the hinge shaft 201 into close contact.

Referring to FIGS. 1, 5, 9, 13 and 17, a guide 60 is provided in the first sliding hinge unit 41, for guiding the head 43a to the direction of the hinge axis A1, facing a side surface of the head 43a.

The sliding and rotating hinge apparatus 10 according to the illustrated embodiment of the present invention is applicable mainly to a portable communication device; however, this should not be construed as limiting the present invention. It is contemplated that the sliding and rotating hinge unit 10 can be applied to a variety of other products (e.g. a folder-type terminal, a horizontally slidable terminal, etc.)

The portable communication device according to the illustrated embodiment of the present invention covers any of mobile communication terminals operating in conformance with communication protocols corresponding to various communication systems, any information communication device such as a Portable Multimedia Player (PMP), an MP3 player, a navigator, a game player, a laptop, an advertisement board, a TV, a digital broadcasting player, a PDA, and a smart phone, any electronic device, any multimedia device, and any application of the mobile communication terminals, the information communication devices, the electronic devices, and the multimedia devices.

An operation of the sliding and rotating hinge apparatus 10 having the above configuration in the portable communication device according to the embodiment of the present invention will be detailed below with continued reference to FIGS. 1 to 19.

As mentioned above, the sliding and rotating hinge apparatus 10 of the portable communication device includes the first and second housings 20 and 30 and the sliding and rotating hinge unit 40. As shown in FIGS. 1 to 5, the sliding and rotating hinge unit 40 includes the first and second sliding hinge units 41 and 42 and the rotating hinge unit 43.

The first sliding hinge unit 41 includes the first sliding housing 41a and the first sliding cam 41b. The first sliding cam 41b having the guide inclined surface 41c is accommodated in the first sliding housing 41a. The second sliding hinge unit 42 includes the second sliding housing 42a, the hinge hole 42b, the second sliding cam 42c, and the elastic member 42d. The rotating hinge unit 43 includes the head 43a, the mover 43b, the engagement releaser 43c, the hinge elastic member 43d, the support housing 43e, and the hinge module 43f.

Figure 5:
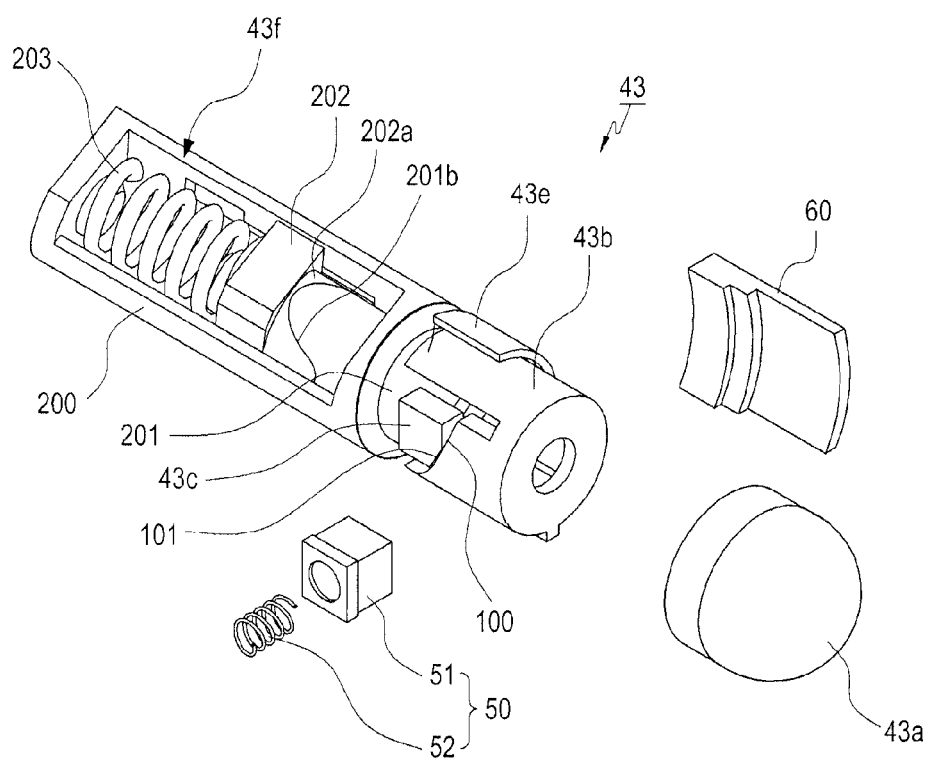
FIG. 5 is an exploded perspective view illustrating the configuration of a rotating hinge unit in the portable communication device and its sliding and rotating hinge apparatus according to an embodiment of the present invention.

FIG. 5 shows a partial assembly state of the rotating hinge unit 43 in which the engagement releaser 43c is engaged with the hinge protrusion 201a of the hinge shaft 201 protruding from the hinge module 43f. In this state the engagement releaser 43c is engaged with the mover 43b with the hinge elastic member 43d interposed between them.

Referring to FIGS. 1, 18 and 19, the head 43a is engaged with the mover 43b and the support housing 43e surrounds the engagement releaser 43c. In this state, the hinge module 43f is inserted into the rotation hole 22 of the first housing 20.

Referring to FIGS. 1, 18 and 19, the head 43a, the mover 43b, the engagement releaser 43c, the hinge elastic member 43d, and the support housing 43e are rotatably engaged within the first sliding housing 41a.

Referring to FIGS. 18 and 19, the head 43a faces the first sliding cam 41b in the first sliding housing 41a in such a manner that the head 43a may slidably contact the first sliding cam 41b. The first sliding cam 41b has the guide inclined surface 41c facing the semi-spherical head 43.

Referring to FIGS. 1, 5, 18 and 19, the elastic presser 50 is provided within the first sliding housing 41a. The guide 60 is accommodated in the first sliding housing 41a to guide the head 43a in the direction of the hinge axis A1, facing the side surface of the head 43a. Within the first sliding housing 41a, the elastic presser 50 is disposed to be brought into contact with the mover 43b of the rotating hinge unit 43, press the mover 43b, and thus slide the mover 43b.

Referring to FIGS. 1, 6, 11, 14 and 15, in this state, the first sliding housing 41a is provided at one end of the second housing 30.

Referring to FIGS. 1, 3, 6, 8, 11, 14, 15 and 16, the second sliding housing 42a is provided at the other end of the second housing 30. The second sliding cam 42c is accommodated in the second sliding housing 42a and the elastic member 42d is engaged with the second sliding cam 42c in the second housing 42a, for providing elastic force.

Referring to FIGS. 1, 3, 8 and 16, the hinge protrusion 23 formed in the first housing 20 is rotatably extended through the hinge hole 42b of the second sliding housing 42a and then rotatably engaged with the second sliding cam 42c.

Referring to FIGS. 10 to 15, in this state, to open the first housing 20 by automatically rotating the second housing 30 with one hand, the user first slides the second housing 30 for a predetermined distance, for example, 1 mm from the first housing 20.

Referring to FIGS. 10 and 11, the first and second sliding hinge units 41 and 42 move together, and the first and second sliding housings 41a and 42a also move together.

Referring to FIGS. 13, 18 and 19, as the first sliding cam 41b slides along with the first sliding housing 41a, the first sliding cam 41b slides the head 43a in the direction of the hinge axis A1. As the head 43a moves in the direction of the hinge axis A1 in conjunction with the first sliding cam 41b, the mover 43b also moves along with the head 43a.

Referring to FIGS. 13, 14, 15, 18 and 19, as the inclined guide portion 100 of the mover 43b moves in the direction of the hinge axis A1, the inclined guide portion 100 rotates the rotation inclined surface 101 of the engagement releaser 43c, because the inclined guide portion 100 has slidingly contacted the rotation inclined surface 101 of the engagement releaser 43c.

As the rotation inclined surface 101 rotates, the engagement releaser 43c also rotates. Since the engagement releaser 43c is engaged with the hinge protrusion 201a of the hinge shaft 201, the engagement releaser 43c rotates the hinge protrusion 201a.

Referring to FIGS. 18 and 19, along with the rotation of the hinge shaft 201, the mountain-shaped portion (201b) of the hinge shaft 201 goes over the valley-shaped portion(202a) of the hinge cam(202) and thus their engagement is released. The mountain-shaped portion(201b) slidingly rotates over the valley-shaped portion(202a), thus rotating the hinge protrusion 201a, the hinge shaft 201, and the engagement releaser 43c.

Referring to FIGS. 14, 15, 18 and 19, the first and second sliding hinge units 41 and 42 and the second housing 30 are automatically rotated along with the rotation of the engagement releaser 43c.

Referring to FIGS. 18 and 19, since the elastic presser 50 is provided in contact with the mover 43b of the rotation hinge unit 43 in the first sliding housing 41a, the mover 43b presses the elastic presser 50, while moving in the direction of the hinge axis A1. In this state, when the first and second sliding hinge units 41 and 42 and the second housing 30 automatically rotate, the elastic presser 50 presses the mover 43b, thereby returning the mover 43b to the original position. The first and second sliding hinge units 41 and 42 also return to their original positions.

Since the hinge elastic member 43d is provided in the mover 43b, the hinge elastic member 43d moves the head 43a and the mover 43b by elastic force. The movement of the head 43a in turn moves the first sliding cam 41b.

Referring to FIGS. 11 and 12, when the second sliding housing 42a slides for 1 mm from the first housing 20, the second sliding housing 42a also slides. The second sliding cam 42c in the second sliding housing 42a supports the movement of the second sliding housing 42a. Note that FIG. 11 shows that the second housing has slid shortly before the second housing has rotated in the first housing. That is, FIG. 11 is a drawing illustrating only the first housing when the second housing has slid in the first housing Referring to FIGS. 11 and 12, the elastic member 42d is pressed within the second sliding housing 42a. When the second housing 30 automatically rotates, the second sliding housing 42a also rotates. After the automatic rotation of the second sliding housing 42a, the compressed elastic member 42d returns the second sliding housing 42a to the original position.

Referring to FIGS. 14 and 15, in this state, the large display 32 on an inner surface of the second housing 30 and the I/O unit 21 of the first housing 20 are used.

Figure 7:
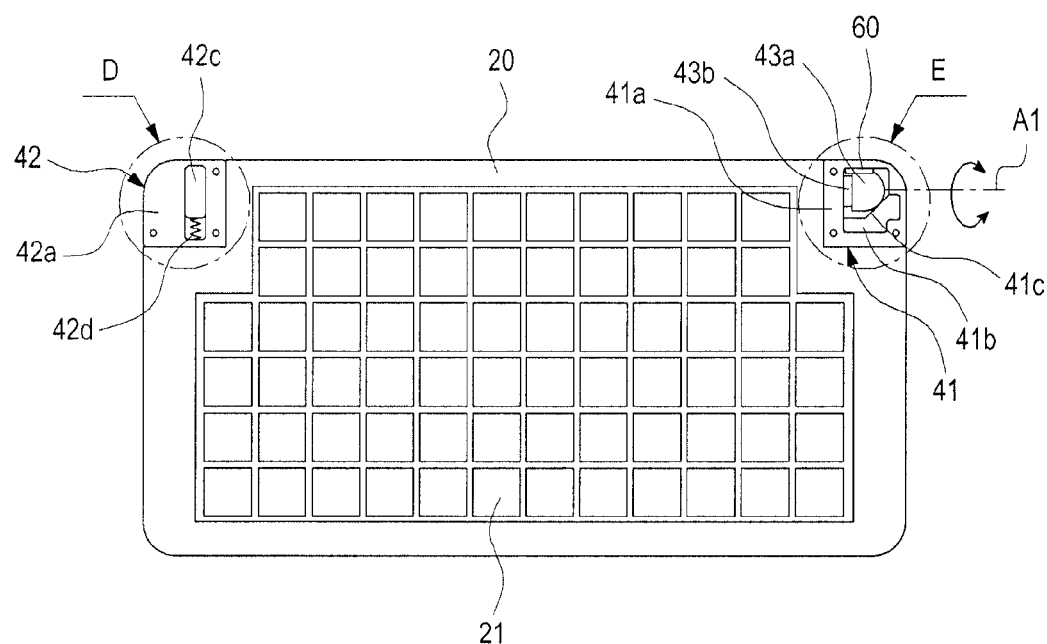
FIG. 7 is a plan view illustrating the bottom housing and portions of the hinge unit inside the bottom housing of the embodiment of FIG. 1 with the portable communication device in the folded state.

Referring to FIGS. 6, 7, and 10, in this state, when the user closes the first and second housings 20 and 30 to each other, the second housing 30 is rotated to its original position, facing the first housing 20.

Referring to FIGS. 6 and 10, along with the second housing 30, the first and second sliding hinge units 41 and 42 rotate to their original positions.

Figure 8:
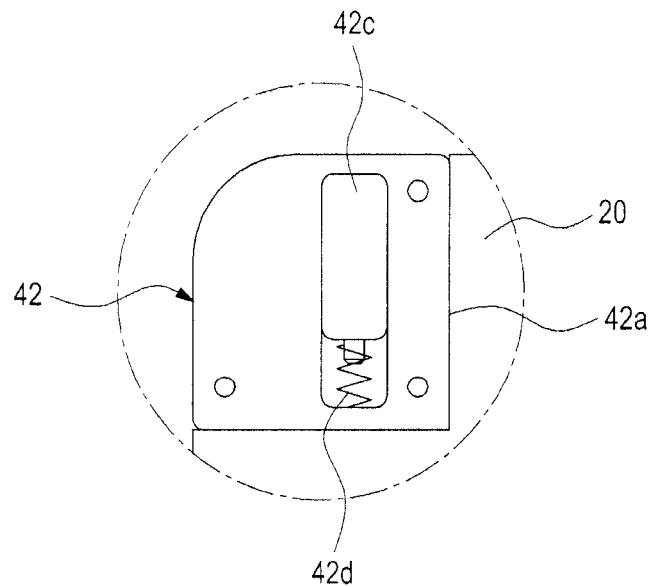
FIG. 8 is an enlarged plan view of a portion D illustrated in FIG. 7.
Figure 9:
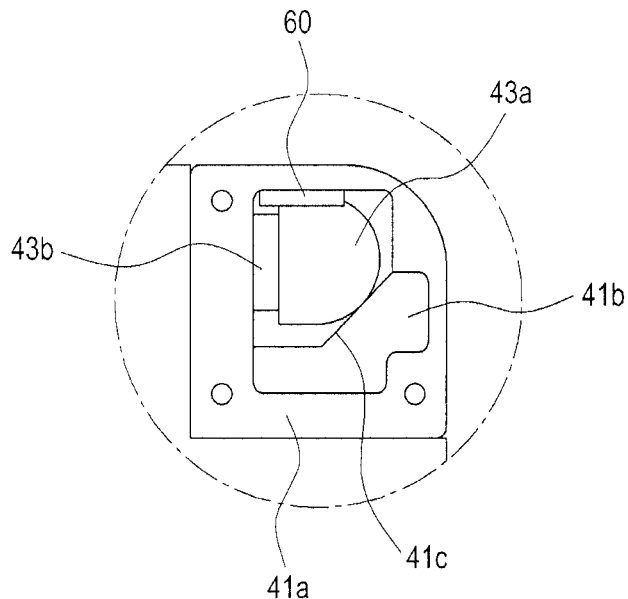
FIG. 9 is an enlarged plan view of a portion E illustrated in FIG. 7.

Referring to FIGS. 8, 9 and 18, the engagement releaser 43c of the rotating hinge unit 43 also rotates. Due to engagement with the hinge protrusion 201a of the hinge shaft 201, the engagement releaser 43c rotates the hinge protrusion 201a to its original position.

Along with the rotation of the hinge shaft 201, the mountain-shaped portion (201b) of the hinge shaft 201 again goes over the valley-shaped portion (202a) of the hinge cam(202) and thus is engaged with the valley-shaped portion(202a).

Thus, the rotations of the hinge shaft 201, the engagement releaser 43c, and the first and second sliding hinge units 41 and 42 are restricted.

Referring to FIG. 6, in this state, the first and second housings 20 and 30 face each other and the large display 31 on an outer surface of the second housing 30 is used.

As is apparent from the above description of the present invention, since the second housing 30 is configured so as to be opened by sliding for a predetermined distance, for example, 1 mm and then automatically rotating, the opening and closing operations of the product are enhanced. In addition, as the user can open or close the second housing 30 easily with one hand, the utilization of the large display 32 or 31 on the inner or outer surface of the second housing 30 can be improved.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A portable communication device comprising:
   a first housing;
   a second housing, facing the first housing when the device is in a folded state; and
   a hinge assembly rotatably engaging the first housing with the second housing, the hinge assembly including:
      a first sliding housing coupled to the second housing and sliding, together with the second housing, with respect to the first housing, to reach a disengaged position, the first sliding housing enclosing a sliding cam that moves in relation to the first sliding housing, and
      a rotating hinge unit including a head, the head contacting the sliding cam such that a movement of the sliding cam causes a corresponding movement of the head on a perpendicular axis relative to an axis of movement of the sliding cam,
   wherein the movement of the head triggers rotation of the rotating hinge unit, thereby automatically rotating the first sliding housing and the second housing around a hinge axis of the hinge assembly to open the device to an unfolded state,
   wherein the sliding cam includes a guide inclined surface that supports the corresponding movement of the head, the sliding cam sliding in a direction perpendicular to the hinge axis, the head moving in a direction parallel to the hinge axis, and further comprises, an elastic presser coupled to the rotating hinge unit,
   wherein rotationally transitioning the first housing and second housing to a closed configuration moves the elastic presser such that the head and the sliding cam are returned to an original position,
   wherein the elastic presser includes: a pressing member for contacting a mover coupled to the head, the pressing member moving the mover by elastic force; and a coil spring for providing the elastic force to the pressing member, and further comprise, an engagement releaser coupled to the mover, and rotating when the mover moves and contacts the engagement releaser; a support housing coupled to the mover, partially enclosing the engagement releaser and providing physical support for the rotation of the engagement releaser and the movement of the mover; and a hinge module having a hinge shaft coupled to the engagement releaser, so that when the engagement releaser rotates, the hinge shaft is released to an engaged state of rotation, the hinge shaft automatically rotating the rotating hinge unit by elastic force provided by a hinge shaft elastic member coupled to the hinge shaft.

2. The portable communication device of claim 1, wherein the sliding of the first sliding housing in a direction perpendicular to the hinge axis of the hinge assembly causes the rotating hinge unit of the hinge assembly to slide in a direction along the axis of the hinge assembly until the disengaged position is reached.

3. The portable communication device of claim 1, wherein the first sliding housing of the hinge assembly attaches to a first end of the second housing, and a second sliding housing coupled to a second end of the second housing, and wherein the head is coupled to an engagement releaser, the engagement releaser triggered by movement of the head to allow a hinge cam enclosed within the hinge assembly to contact a rotation inclined surface according to tension provided by an elastic presser to cause the second housing to automatically rotate around the hinge axis of the hinge assembly when attachment unit slides.

4. The portable communication device of claim 1, wherein at least one of an Input/Output (I/O) unit, a speaker, a microphone, a camera module, and a battery pack is provided in the first housing, and the I/O unit includes at least one of a display, a touch screen, a keypad, a keyboard, a navigation key, QWERTY keys, and a game-dedicated key.

5. The portable communication device of claim 1, wherein at least one of a large display, a touch screen, a speaker, a microphone, and a camera module is provided in the second housing.

6. The portable communication device of claim 1, wherein the second housing and hinge assembly together slide with respect to the first housing from an engaged position for a distance on the order of 1 mm to reach the disengaged position.

7. A hinge assembly in a portable communication device, comprising:
a first sliding housing coupled to a first end of a second housing sliding, together with the second housing, with respect to a first housing, to reach a disengaged position, the first sliding housing enclosing a sliding cam that moves in relation to the first sliding housing;
a second sliding housing coupled to a second end of a second housing, the second end being opposed to the first end, sliding, together with the second housing, with respect to the first housing, to reach the disengaged position in parallel with the first sliding housing; and
a rotating hinge unit coupled to a first housing, the rotating hinge unit including a head, the head contacting the sliding cam such that a movement of the sliding cam causes a corresponding movement of the head on a perpendicular axis relative to an axis of movement of the sliding cam,
the movement of the head triggering rotation of the rotating hinge unit, thereby automatically rotating the first sliding housing, second sliding housing and the second housing around a hinge axis of the rotating hinge unit transitioning the first housing and second housing to an open configuration,
wherein the sliding cam includes a guide inclined surface that supports the corresponding movement of the head, the sliding cam sliding in a direction perpendicular to the hinge axis, the head moving in a direction parallel to the hinge axis, and further comprises an elastic presser coupled to the rotating hinge unit, wherein rotationally transitioning the first housing and second housing to a closed configuration moves the elastic presser such that the head and the sliding cam are returned to an original position,
wherein the elastic presser includes: a pressing member for contacting a mover coupled to the head, the pressing member moving the mover by elastic force; and a coil spring for providing the elastic force to the pressing member, and further comprise,
an engagement releaser coupled to the mover, and rotating when the mover moves and contacts the engagement releaser;
a support housing coupled to the mover, partially enclosing the engagement releaser and providing physical support for the rotation of the engagement releaser and the movement of the mover; and
a hinge module having a hinge shaft coupled to the engagement releaser, so that when the engagement releaser rotates, the hinge shaft is released to an engaged state of rotation, the hinge shaft automatically rotating the rotating hinge unit by elastic force provided by a hinge shaft elastic member coupled to the hinge shaft.

8. The hinge assembly of claim 7, further comprising:
a hinge hole formed in the second sliding housing, for allowing a hinge protrusion of the first housing to rotatably extend through the hinge hole;
a second sliding cam, at least partially enclosed by the second sliding housing, rotatably engaged with the hinge protrusion housing, for supporting movement of the second sliding housing; and
an elastic member engaged with the second sliding cam and enclosed within the second sliding housing, for providing elastic force to move the second sliding housing.

9. The hinge assembly of claim 7, wherein the head has a semi-spherical configuration for contact with the guide inclined surface of the sliding cam.

10. The hinge assembly of claim 7, wherein the mover includes an inclined guide portion for guiding rotation of the engagement releaser during movement of the mover.

11. The hinge assembly of claim 10, wherein the engagement releaser includes a rotationally inclined surface coupled with the inclined guide portion of the mover.

12. The hinge assembly of claim 7, wherein the hinge module includes:
a hinge housing installed in a rotation hole formed in the first housing, the hinge housing being substantially hollow, thereby having a hollow accommodation space accessible through an opening hole formed at one distal end of the hinge housing;
the hinge shaft rotatably coupled within the accommodation space, and at a first distal end of the hinge shaft, having a hinge protrusion extending through the opening hole and coupled to the engagement releaser and, at a second distal end of the hinge shaft, having a mountain-shaped portion coupler;
a hinge cam having, at a first distal end of the hinge cam, a valley-shaped portion coupler coupled to the mountain-shaped portion; and
the hinge shaft elastic member providing elastic force to connect the hinge cam and the hinge shaft.

13. The hinge assembly of claim 12, wherein the rotation of the engagement releaser causes the mountain-shaped portion of the hinge shaft to slip over the valley-shaped portion of the hinge cam, thereby releasing engagement between the hinge cam and hinge shaft,
the mountain-shaped portion rotating over the valley-shaped portion, thereby providing force to the hinge shaft, the hinge shaft automatically rotating by the force, and
the automatic rotation of the hinge shaft automatically rotating the first sliding housing, the second sliding housing and the second housing.

14. The hinge assembly of claim 7, wherein a guide is at least partially enclosed in the first sliding housing for guiding movement of the head along the hinge axis.

15. A handheld portable device comprising:
a first housing;
a second housing, facing the first housing when the device is in a folded state; and
a hinge assembly, rotatably coupled to the first and second housings, having a first sliding housing coupled to the second housing and sliding, together with the second housing, with respect to the first housing to reach a disengaged position, the first sliding housing enclosing a sliding cam that moves in relation to the first sliding housing, and
a rotating hinge unit, triggered by the sliding cam to automatically rotate when the disengaged position is reached, thereby automatically rotating the first sliding housing and the second housing around a hinge axis of the rotating hinge unit to open the device to an unfolded state,
wherein the sliding cam includes a guide inclined surface that supports the corresponding movement of a head, the sliding cam sliding in a direction perpendicular to the hinge axis, the head moving in a direction parallel to the hinge axis, and further comprises,
an elastic presser coupled to the rotating hinge unit, wherein rotationally transitioning the first housing and second housing to a closed configuration moves the elastic presser such that the head and the sliding cam are returned to an original position,
wherein the elastic presser includes: a pressing member for contacting a mover coupled to the head, the pressing member moving the mover by elastic force; and a coil spring for providing the elastic force to the pressing member, and further comprise,
an engagement releaser coupled to the mover, and rotating when the mover moves and contacts the engagement releaser;
a support housing coupled to the mover, partially enclosing the engagement releaser and providing physical support for the rotation of the engagement releaser and the movement of the mover; and
a hinge module having a hinge shaft coupled to the engagement releaser, so that when the engagement releaser rotates, the hinge shaft is released to an engaged state of rotation, the hinge shaft automatically rotating the rotating hinge unit by elastic force provided by a hinge shaft elastic member coupled to the hinge shaft.

16. The handheld portable device of claim 15, wherein:
the sliding cam of the first sliding housing is sliding in a direction perpendicular to the hinge axis of the hinge unit, movement of the sliding cam causing a head of the rotating hinge unit to slide in a direction parallel to the axis of the hinge unit until the disengaged position is reached, further comprising:
the first sliding housing attaching to a first distal end of the second housing, and
a second sliding housing attaching to a second distal end of the second housing, the second distal end being opposed to the first distal end; and
a head coupled to the sliding cam to cause the head to slide when the first sliding housing slides, the movement of the head triggering automatic rotation of the rotating hinge unit.

* * * * *